United States Patent [19]
Benson

[11] Patent Number: 6,104,800
[45] Date of Patent: Aug. 15, 2000

[54] METHOD FOR PROVIDING CALL WAITING NOTIFICATION TO A PARTY ENGAGED IN A DATA CALL

[75] Inventor: Harvey J. Benson, Westminster, Colo.

[73] Assignees: MediaOne Group, Inc., Englewood; U S West, Inc., Denver, both of Colo.

[21] Appl. No.: 08/747,478

[22] Filed: Nov. 12, 1996

[51] Int. Cl.⁷ .............................. H04M 3/20; H04M 1/57; H04M 11/06

[52] U.S. Cl. ..................... 379/215; 379/93.35; 379/142

[58] Field of Search ............................. 379/89, 127, 142, 379/210, 211, 212, 214, 215, 93.35, 88.25

[56] References Cited

U.S. PATENT DOCUMENTS

| | | | |
|---|---|---|---|
| 4,661,975 | 4/1987 | Brecher | 379/211 X |
| 4,852,151 | 7/1989 | Dittakavi et al. | 379/93.35 |
| 4,922,523 | 5/1990 | Hashimoto | 379/93.25 |
| 4,947,421 | 8/1990 | Toy et al. | 379/67.1 |
| 4,995,074 | 2/1991 | Goldman et al. | 379/93.35 |
| 5,007,076 | 4/1991 | Blakley | 379/88.21 |
| 5,263,084 | 11/1993 | Chaput et al. | 379/215 |
| 5,287,401 | 2/1994 | Lin | 379/93.35 |
| 5,369,688 | 11/1994 | Tsukamoto et al. | 379/100.06 |
| 5,392,334 | 2/1995 | O'Mahony | 379/67.1 |
| 5,432,616 | 7/1995 | Fukao et al. | 358/434 |
| 5,513,251 | 4/1996 | Rochkind et al. | 379/93.35 |
| 5,550,908 | 8/1996 | Cai et al. | 379/142 X |
| 5,805,587 | 9/1998 | Norris et al. | 379/215 X |

*Primary Examiner*—Harry S. Hong
*Attorney, Agent, or Firm*—Holme Roberts & Owen

[57] ABSTRACT

The present invention is directed to a method for providing a first party, engaged in a data call, i.e. a data transmission or communication between machines, call waiting notification without interrupting the data call the first party is engaged in. One embodiment of the present invention includes a central office adjunct which detects a third party call to a first party already engaged in a data call, generates a call waiting data portion compatible with the data call, when said third party call is detected, and merges the call waiting data portion with the data call. One aspect of the present invention includes the first party's computer, loaded with appropriate software, detecting the call waiting data portion and using the computer's output devices to notify the first party of the presence of the third party call. Another aspect of the present invention includes allowing the first party the options of taking the third party call and holding the data call, or redirecting the third party call, or ignoring the third party call.

16 Claims, 8 Drawing Sheets

METHOD FOR PROVIDING CALL WAITING NOTIFICATION TO A PARTY ENGAGED IN A DATA CALL

FIELD OF THE INVENTION

The invention relates generally to telephone subscriber services and more particularly to a service for use by parties engaged in data calls.

BACKGROUND OF THE INVENTION

Generally, as shown in FIG. 1, a telephone 10 is connected via a telephone loop 12 to the line side 14 of a central office switch 16. This connection enables a user of the telephone 10 to communicate with others, either on the line side 14, or on the trunk side 18, which connects the central office switch 16 to other central offices via central office trunks. The telephone loop 12 typically consists of two conductors commonly referred to as the "tip" 20 and "ring" 22, which enable a user of the telephone 10 to talk and listen at the same time. The central office switch 16 includes switching fabric 15, to direct calls between the line side 14 and trunk side 18, or between two lines on the line side 18. The central office switch's 16 directing of calls is controlled by processors 17.

Conventional call waiting service occurs when a subscriber of such a service is engaged in a voice call with a second party and a third party calls the subscriber, seeking to speak with the subscriber. In this circumstance, conventional call waiting service interrupts the subscriber's second party call with a brief audible call waiting tone, typically 440 hz for 300 milliseconds. For example, the subscriber's line is interrupted 300 milliseconds with a 440 hz tone. As a result, the subscriber is notified of the third party's call without appreciable disruption to the subscriber's second party call. The third party, unaware that the subscriber is engaged in a telephone call with the second party, hears audible ringing.

A conventional call waiting service also provides a subscriber the option to either "take" the third party call and place the second party call "on hold" or continue the second party call and ignore the third party call. For example, a subscriber can elect to "take" a third party call by flashing the switch hook on the subscriber's telephone, which results in the second party call being placed on "hold" and the subscriber's telephone connection being switched to the third party call. If the subscriber elects to continue the second party call, the third party continues to hear an audible ring or is given a busy signal or is switched to the subscriber's voice messaging service.

Traditionally, telephone lines are used for voice calls between persons. However, telephone lines are increasingly used for data calls, i.e., data transmissions and communications between machines including, for example, facsimile machines and computers. Typically, telephone lines solely dedicated to data calls are provided in addition to telephone lines solely dedicated to voice calls. Recently, data calls have become an increasingly affordable and popular means of communication, especially at home where usually a single telephone line is provided. For example, the use of a telephone line, with a computer, to navigate the Internet has become an increasingly popular at-home activity. In this regard, a subscriber uses a computer to communicate with a remote computer system via a telephone line, which maybe the same telephone line ordinarily used for voice calls.

The interruption caused by conventional call waiting service, e.g. 440 hz for 300 milliseconds, is often incompatible with a subscriber's data call. In this regard, a computer communicates with a remote computer system via telephone line by the use of a modem. The modem is a device which converts a digital signal from the computer into an analog signal for transmission via the telephone line, and converts an analog signal from the telephone line into a digital signal for receipt by the computer during the data conversion process. The modem typically detects a carrier signal, which is a signal sent by the remote computer system containing information. A conventional call waiting tone may interrupt a continuous carrier signal, thereby causing the loss of the carrier signal and appreciable disruption of the data call.

Moreover, a subscriber, realizing that their data call may be interrupted, may deactivate the conventional call waiting service during the subscriber's data call. Consequently, the subscriber will not be notified of third party calls during the data call, thereby defeating the purpose of a conventional call waiting service.

SUMMARY OF THE INVENTION

It is an objective of the present invention to provide a service to a first party which does not require the first party to install hardware in order to be notified of a third party call during the first party's data call.

It is an objective of the present invention to provide a central office switch adjunct (referred to as a "platform"), capable of providing call waiting notification to a first party engaged in a data call, which shares the platform's resources among the telephone lines serviced by the line side of a central office switch.

It is an objective of the present invention to provide a platform, capable of providing call waiting notification to a first party engaged in a data call, which can be shared among more than one central office switch.

The present invention is directed to a method for providing a first party call waiting notification without interrupting a data call the first party may be engaged in. One embodiment of the present invention includes a platform which detects a third party call to a first party already engaged in a data call, generates a call waiting data portion compatible with the data call, when said third party call is detected, and merges the call waiting data portion with the data call to notify the first party of the third party call. The call waiting data portion is detected at the first party's computer, and the first party's computer's visual and/or audible resources are used to notify the first party of the presence of the third party call.

One aspect of the present invention includes monitoring telephone lines to determine if a certain telephone line is being used for a data call. In this regard, a platform includes detecting hardware for each telephone line monitored for automatically determining whether the telephone line is being used for a data call. Alternatively, the detecting hardware is shared by a number of telephone lines. In this shared arrangement, the detecting hardware polls the monitored telephone lines periodically to determine whether a specific telephone line is being used for a data call. Preferably, the detecting hardware constantly provides a status (i.e., data call or voice call) for each telephone line monitored.

Another aspect of the present invention includes monitoring telephone lines for the presence of conventional call waiting signals. The platform includes a sensor for detecting a call waiting signal generated by a central office. Upon detection, the status of the telephone at issue is ascertained.

If the telephone line is being used for a voice call, the conventional call waiting signal proceeds as intended. If the telephone line is being used for a data call, the conventional call waiting signal is filtered out, and a new, compatible call waiting signal is generated and merged with the data call. Alternatively, the status for each telephone line is provided directly to the central office, and for those telephone lines engaged in a data call, the conventional call waiting service is cancelled. Further, for those telephone lines used for data calls, the central office directs the platform to issue appropriate call waiting notification, when the central office detects a third party call to a first party already engaged in a data call.

Another aspect of the present invention includes generating a compatible call waiting data portion and merging the call waiting data portion with a data call. In this regard, merging the call waiting data portion with the data call includes modulating the data call with the call waiting data portion. For example, the platform decreases the transport rate of the data call, generates a call waiting data portion and merges the data call with the call waiting data portion. Alternatively, the platform decreases the transport rate of the data call and places the data portion of the data call into a temporary memory buffer, which provides an opportunity to merge the call waiting data portion with the data portion. After merging, the transport rate is increased to its original level.

Another aspect of the present invention includes detecting the presence of the call waiting data portion merged with the data call. In this regard, the called party's computer detects the call waiting data portion by the use of a software program. The computer software is provided to the called party via, for example, the Internet. The computer software monitors the digital signal resulting from the data conversion process and detects a predetermined sequence of data (i.e., the call waiting data portion), thereby indicating the presence of a third party call. Upon detection, the called party's computer indicates that a third party call is waiting and provides the called party the option of taking the third party call. The indication is provided in a number of ways, including for example, a visual message, a visual icon, an audible message or an audible tone.

Another aspect of the present invention includes encoding the call waiting data portion, to be generated and merged with the data call, with information regarding the third party call. For example, the platform can generate a call waiting data portion that corresponds to the third party's name and/or telephone number. In this regard, the call waiting data portion is detected and translated by the subscriber's computer and the translated information regarding the third party caller is provided to the called party. Further, the indications described above can be further enhanced with, for example, a visual or audible message identifying the third party caller and/or third party caller's telephone number.

Another aspect of the present invention includes providing the called party the option to hold the data call and answer the third party call using, for example, either the audio capabilities of the called party's computer or an associated telephone set. If the third party call is taken, the platform detects a switch hook flash from the called party, thereby indicating that the data call is to be held and the third party call switched to the called party's telephone line. Preferably the data call is maintained during the pendency of the called party's third party call to allow reconnection to the data call upon completion of the third party call.

Another aspect of the present invention includes providing the called party the options of either indirectly taking or redirecting the third party call. In this regard, a computer input device, such as a keyboard or mouse, can be used to redirect the third party call. For example, the keyboard can be used to accept input from the called party to return a fixed message to the incoming caller, such as, "I am presently on a data call and cannot take your call at this time" or to redirect the incoming call to a voice messaging service or device or to redirect the incoming call to a second phone line or a cellular phone. Redirection of the third party call can be further enhanced by a voice message to the third party indicating that the third party's call is being redirected and will be answered live.

DETAILED DESCRIPTION

Figure 1:
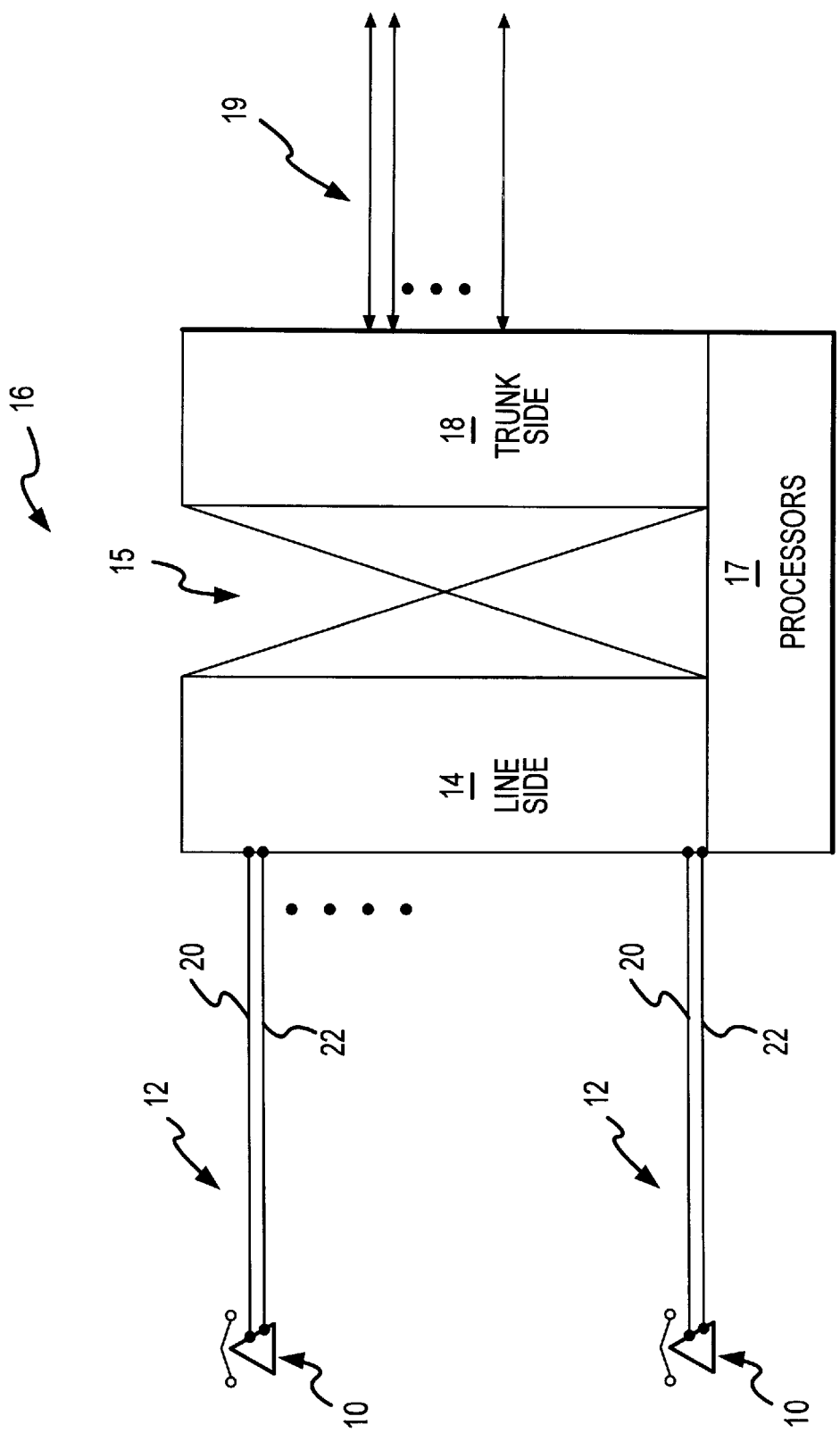
FIG. 1 illustrates a prior art telephone system.
Figure 2:
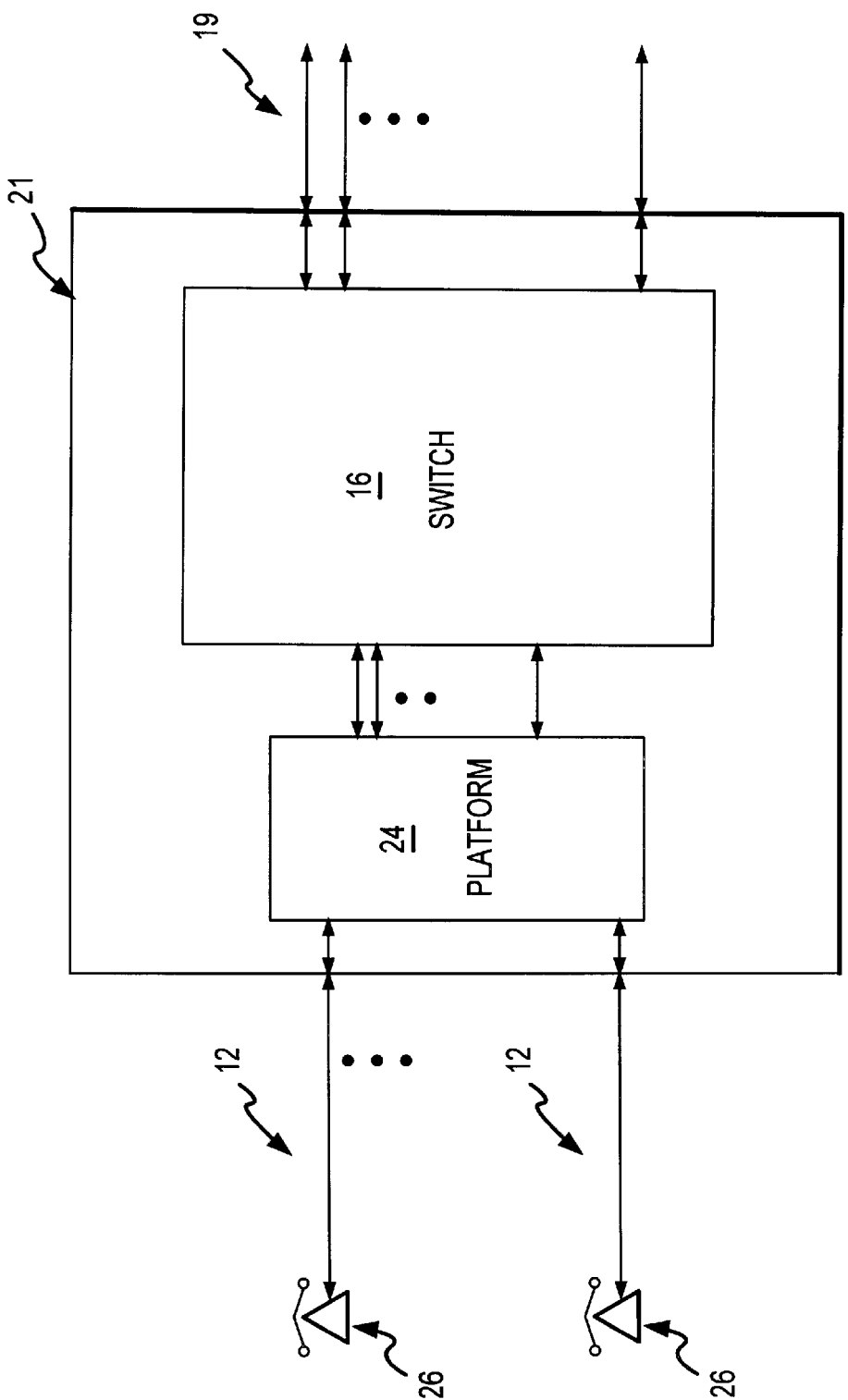
FIG. 2 illustrates a central office adjunct in accordance with one embodiment of the present invention.

As shown in FIG. 2, one embodiment of the present invention includes central office adjunct, referred to as a platform 24, located on the line side of the central office switch 16, which provides for a call waiting service to subscribers 26 engaged in data calls, i.e., data transmissions and communications between machines including, for example, facsimile machines and computers. The platform 24 and central office switch are included in the central office 21.

Figure 3A:
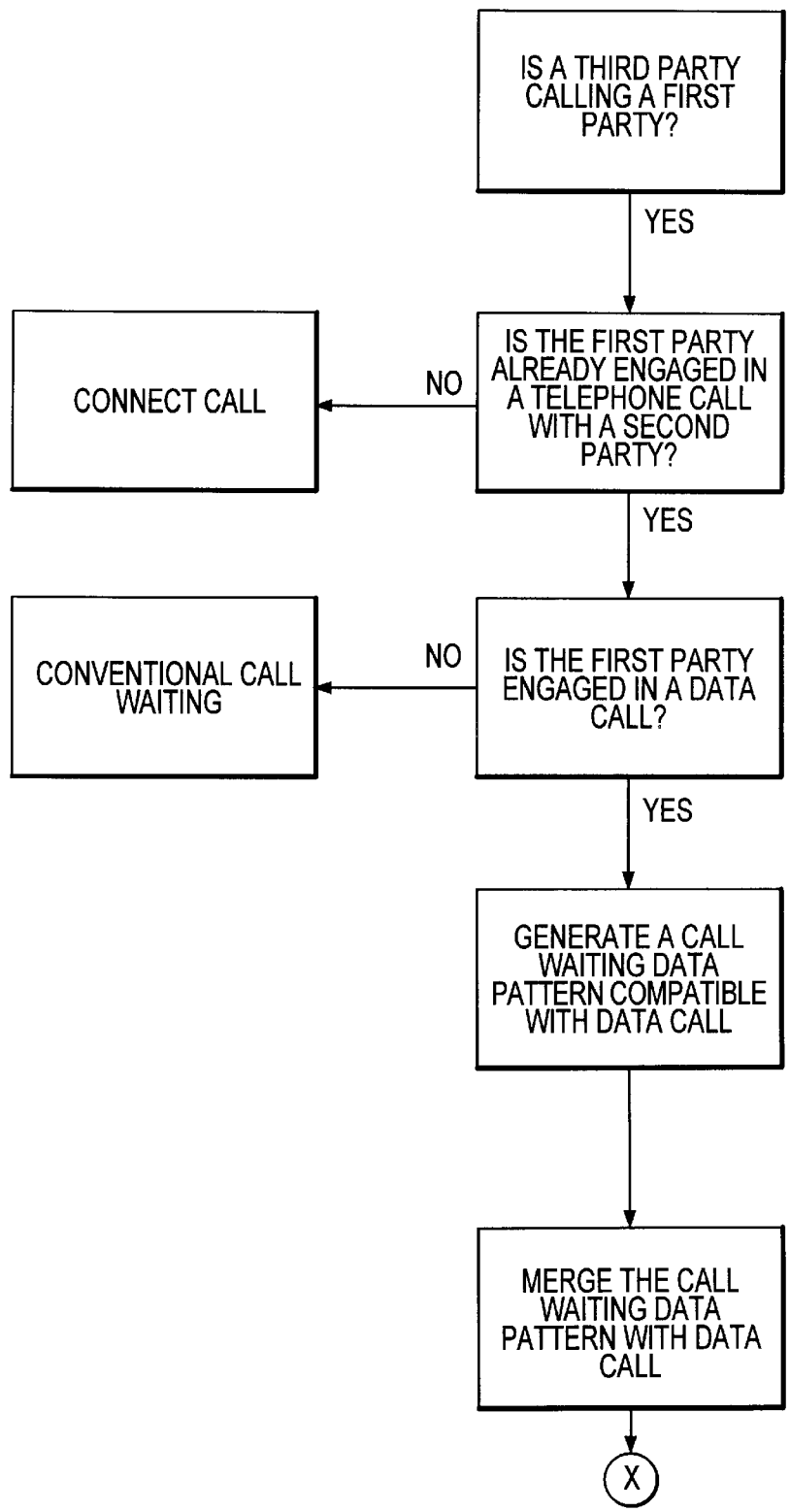
FIGS. 3a and 3b illustrate a flow chart in accordance with one embodiment of the present invention.
Figure 3B:
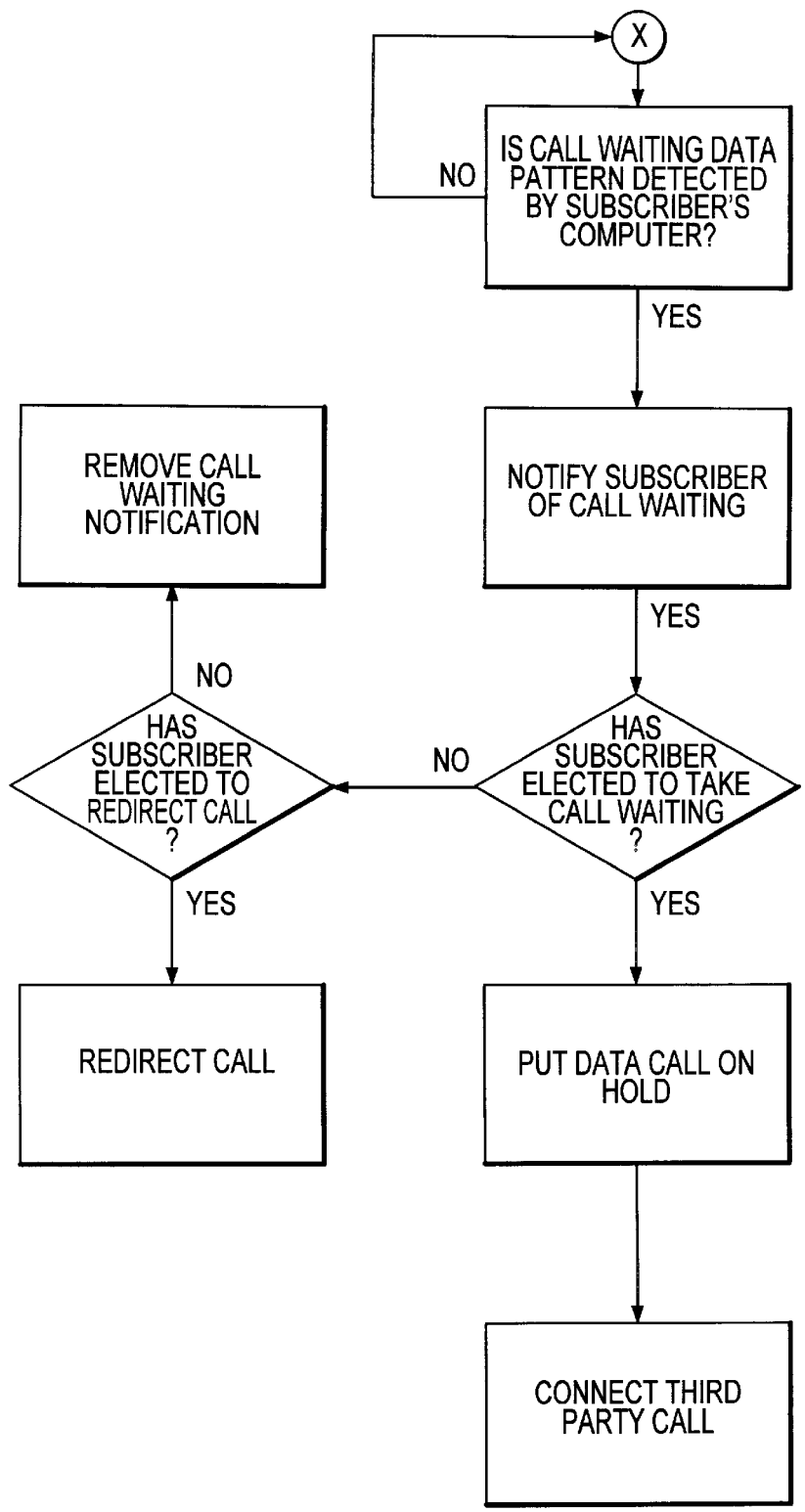

Referencing FIGS. 3A–3B, the platform 24 monitors telephone lines 12 to identify subscribers 26 who are engaged in data calls; detects third party calls to subscribers engaged in data calls; and generates a call waiting data portion and merges the call waiting data portion with the data call. The call waiting data portion generated by the platform 24, and merged with the data call, is detected at a subscriber's computer by the use of specially loaded software. Upon detection, the subscriber's computer issues, for example, an audible tone and/or visual icon, thereby notifying the subscriber of a call waiting. The subscriber can elect to ignore the call waiting, or discontinue the data call and take the third party call.

Figure 4:
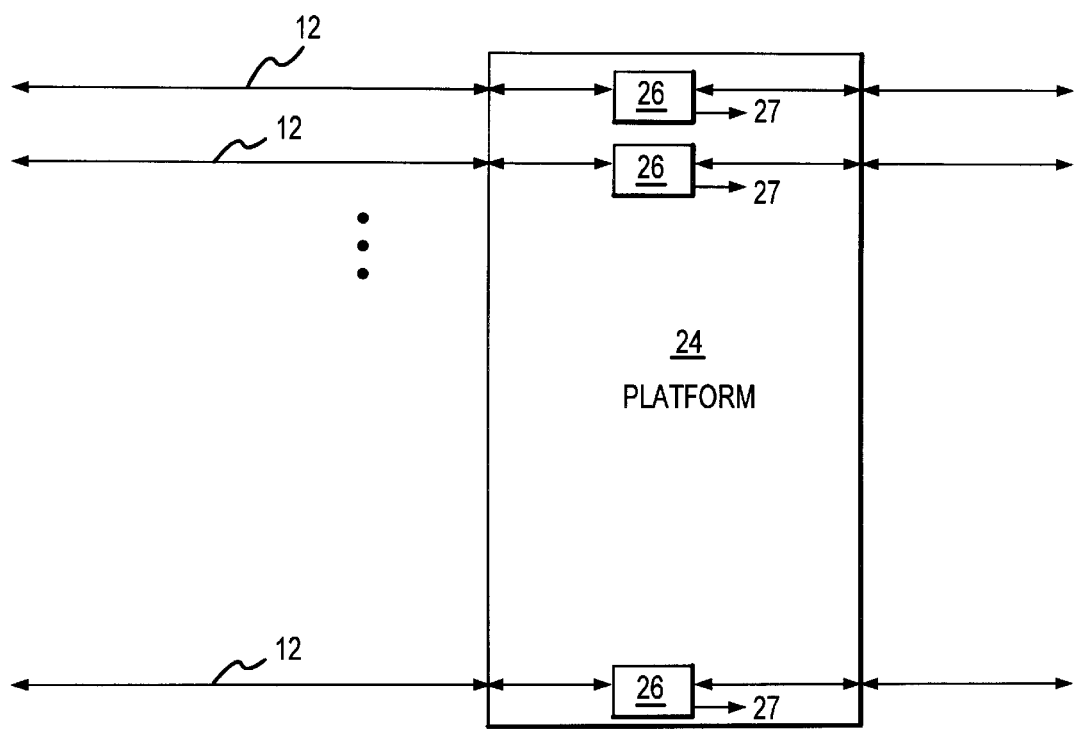
FIG. 4 illustrates detecting hardware for a platform in accordance with one aspect of the present invention.
Figure 5:
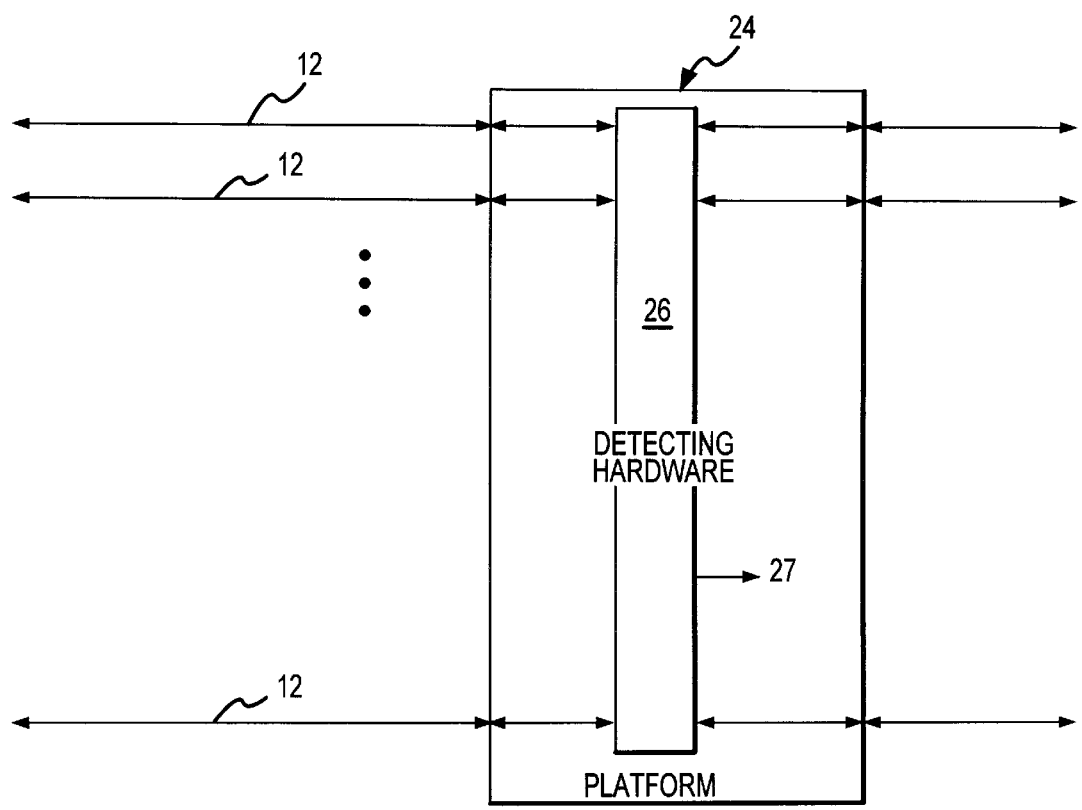
FIG. 5 illustrates the detecting hardware in a shared arrangement in accordance with one aspect of the present invention.

The platform 24 is capable of determining whether a particular telephone line 12 is engaged in a voice call or a data call. As shown in FIG. 4, the platform 24 includes detecting hardware 26 for each telephone line 12 monitored by the platform 24. The detecting hardware 26 uses circuitry known to those skilled in the art to detect data patterns and/or carrier patterns which are commonly present during a data call and provide a status 27 (i.e., voice call or data call). For example, the detecting hardware 26 can be designed to ascertain the presence of a data pattern indicating that the handshaking process, which commonly occurs during a data call, and provide the appropriate status 27. As shown in FIG. 5, the detecting hardware 26 can also be shared among a number of telephone lines 12. In this regard, the detecting hardware 26 polls each telephone line 12 periodically to determine whether data patterns and/or carrier elements are present and provides a status 27 (i.e., voice call or data call) for each telephone line 12 monitored by the platform 24.

Figure 6:
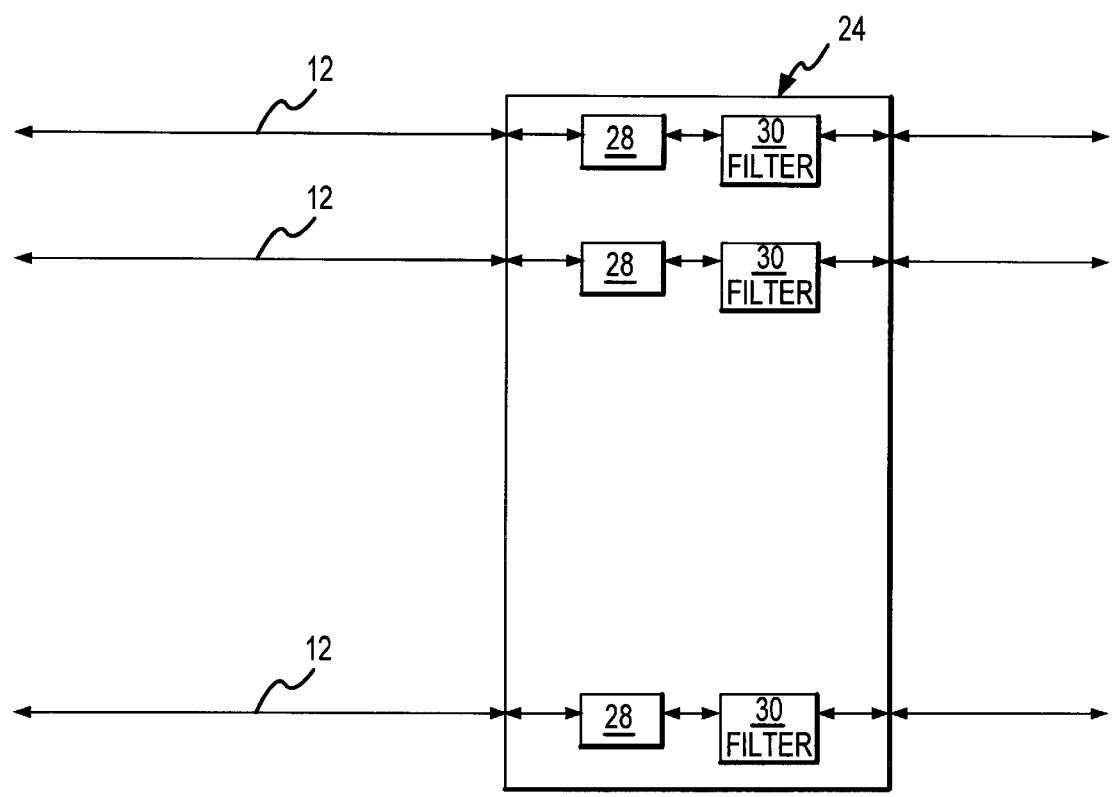
FIG. 6 illustrates a sensor and filter for a platform in accordance with one aspect of the present invention.
Figure 7:
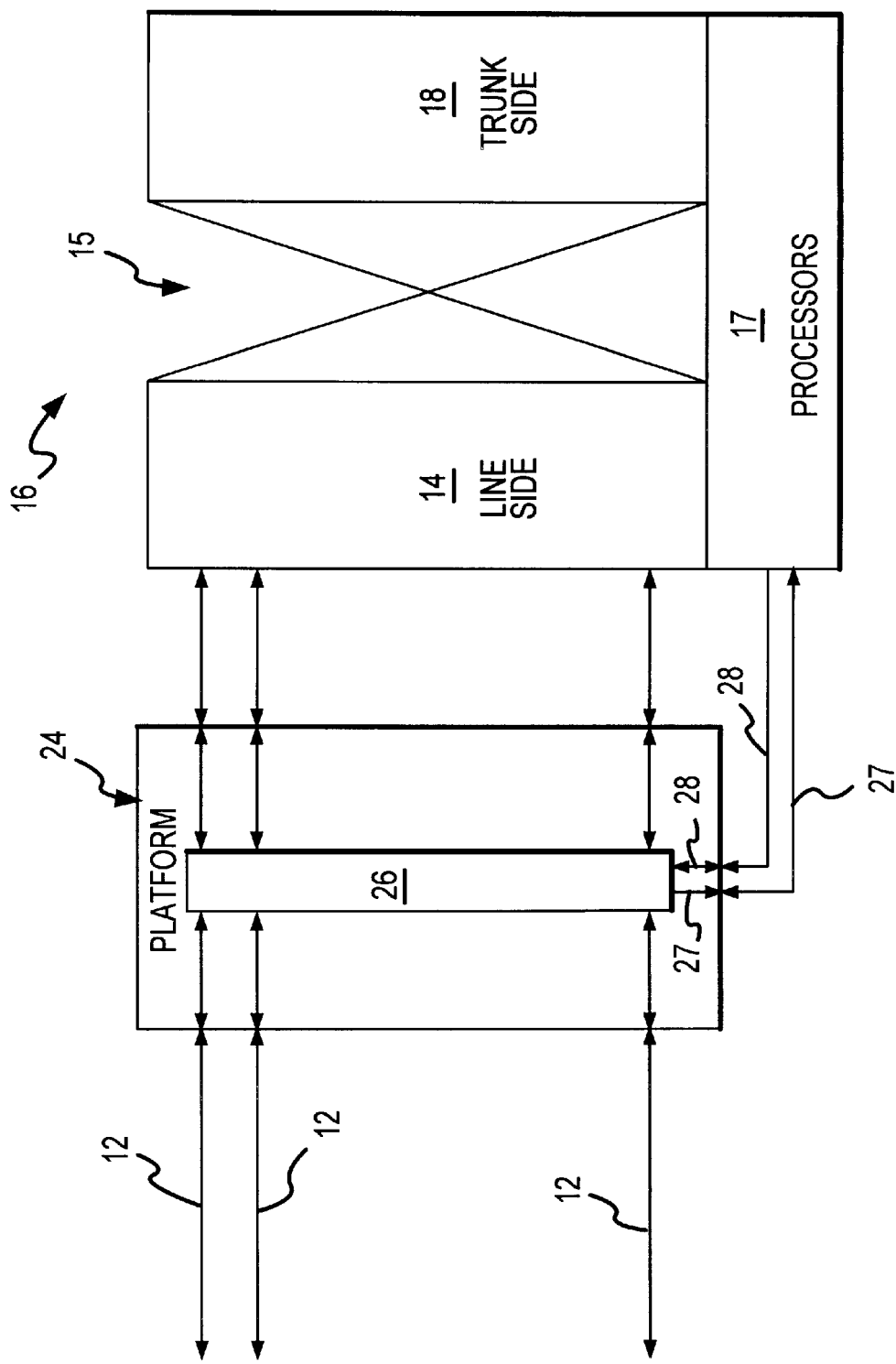
FIG. 7 illustrates the relationship between a platform and a central office in accordance with one aspect of the present invention.

The platform 24 is further capable of detecting third party calls to subscribers 26 engaged in data calls. In this regard, the platform 24 includes a sensor 28 for detecting a conventional call waiting signal generated by the central office 16 and a filter 30 for blocking the conventional call waiting signal from the intended subscriber 26. As shown in FIG. 6, the sensor 28 is positioned on a subscriber's telephone line 12. Preferably, the sensor detects the rising edge of the conventional call waiting signal. As further shown in FIG. 6, the filter 30 is positioned on a subscriber's telephone line 12 to block the conventional call waiting signal from reaching the subscriber. For example, the filter 30 can be designed to detect the rising edge of a conventional call waiting signal and attenuate the conventional call waiting signal before the signal affects the subscriber's call. Alternatively, a conventional call waiting service is cancelled if the status 27 provided by the platform 24 indicates a data call and the platform 24 initiates the call waiting signal. As shown in FIG. 7, the platform 24 provides status information to the central office via line 32 for each telephone line 12 monitored by the platform 24. The central office processor 17 monitors the status 27 provided and automatically cancels the conventional call waiting service for telephone lines 12 being used for a data call. The processor 17 further notifies the platform 24 via line 28 that a call is waiting for a particular telephone line 12 that is engaged in a data call.

The platform 24 is further capable of notifying a subscriber 26 of a call waiting. In this regard, the present invention notifies a subscriber, engage in a data call, of a call waiting without appreciably disrupting the subscriber's data call. The platform 24 accomplishes notification without appreciable disruption by interjecting into the data call such that from the subscriber's perspective and the remote computer's perspective, the data call is perceived as being maintained. For example, the platform 24 can decrease the transport rate of the data call, which allows the platform 24 to merge or modulate the data call with a call waiting data portion. Alternatively, the platform 24 decreases the transport rate of the data call and temporarily stores the data stream from the data call in a memory buffer, to create a gap in the data call while maintaining the data call's hand shaking process. In this regard, the time interval of the gap is small enough so that the data call is not adversely affected. The call waiting data portion is merged into the data call at the gap and the transport rate is increased to the original transport rate.

Another aspect of the invention includes the subscriber's computer, loaded with specially designed computer software, detecting the call waiting data portion and notifying the subscriber of a call waiting. In this regard, the computer software monitors the digital signal resulting from the subscriber's computer's data conversion process and detects a predetermined sequence of data (i.e., the call waiting data portion), thereby indicating a call waiting. Upon detection, the subscriber's computer notifies the subscriber that a third party call is waiting and provides the subscriber the option of taking the third party call. Subscriber notification can be provided in a number of ways, including for example, a visual message, a visual icon, an audible message or an audible tone.

Alternatively, the call waiting data portion, generated and merged with the data call, contains encoded information regarding the third party call. For example, the platform can generate a call waiting data portion encoded with the third party's name and telephone number. In this regard, the subscriber's computer is programmed to detect and decode the call waiting data portion and provide the third party caller's information to the subscriber. The subscriber notifications described above can be further enhanced with, for example, a visual or audible message identifying the third party caller and/or third party caller's telephone number.

Another aspect of the invention includes providing the subscriber the option of directly answering the third party telephone call. The subscriber's computer can be programmed to accept input from the subscriber regarding whether to "take" the third party call. For example, the subscriber can use an input device, such as a keyboard or a mouse, to "take" the third party call. If taken, the data call is put on hold and the third party call is directed to the subscriber. In this regard, the platform is capable of detecting a switch hook flash, thereby indicating that the data call is to be held and the third party is to be switched to the subscriber's telephone line. For example, the platform can notify a central office switch to switch the third party call to the subscriber's line. Alternatively, the platform can further comprise a switching network which would enable the platform to switch the third party call to the subscriber's line.

Preferably, the data call is maintained during the pendency of the subscriber's third party call. For example, the data call can be held during the pendency of the third party call and the subscriber reconnected to the data call upon completion of the third party call. In this regard, the data call can be held at the platform by the use of a memory buffer, which would temporarily store the data signals generated by the data call and provide the stored data signals to the subscriber's computer upon reconnection. Further, the subscriber's computer can be programmed to provide data signals simulating the handshaking process to the subscriber's computer modem. Consequently, the data call is "graciously" held during the pendency of the third party call and resynchronized on completion of the third party call. Reconnection of the data call can occur by subscriber's input, such as using a mouse to remove an icon on a visual display, which would cause the platform to reconnect the data call.

Alternatively, the data call can be continued during the pendency of the third party call. For example, multiplexing technology, known to those skilled in the art, can be used to split the bandwidth and thereby convert a single telephone line into one capable of transmitting two calls. In this regard, the transport rate of the data call would be reduced and placed on a portion of the bandwidth and the third party call would be placed on another portion of the bandwidth. By way of further example, the data call and third party call can be placed simultaneously on the same telephone line. In this regard, modulating technology, known to those skilled in the art, can be used to modulate the data call with the third party call at the platform and demodulate at the subscriber's location.

Another aspect of the invention includes providing the subscriber the options of either indirectly answering or redirecting the third party telephone call. In this regard, a subscriber's computer's input device, such as a keyboard or mouse, can be used to redirect the third party call. For example, the subscriber can be provided the options of returning a fixed message to the third party caller, such as, "I am presently on a data call and cannot take your call at this time"; or redirecting the incoming call to a voice messaging service or device; or redirecting to a second phone line or a cellular phone. The redirection option can be further enhanced by a message to the incoming caller telling them that their call is being redirected and will be answered live.

The foregoing description of the present invention has been presented for purposes of illustration and description. The description is not intended to limit the invention to the form disclosed herein. Consequently, the invention and modifications commensurate with the above teachings and skill and knowledge of the relevant art are within the scope of the present invention. The preferred embodiment described above is also intended to explain the best mode known of practicing the invention and to enable others skilled in the art to utilize the invention in various embodiments and with the various modifications required by their particular applications for use of the invention. It is intended that the appended claims be construed to include all alternative embodiments as permitted by the prior art.

What is claimed is:

1. In a telephone system, a method for providing call-waiting notification to remotely located subscribers from a central office, where at least one of the subscribers is engaged in a data call when a third party seeks to communicate with the subscriber, said method comprising the steps of:
   providing a plurality of telephone lines which allow the subscribers to engage in either a voice call or a data call, but not both simultaneously;
   automatically determining when a third party seeks to communicate with one of the subscribers via one of the telephone lines which is engaged;
   polling the engaged telephone line and detecting whether the engaged telephone line is carrying a data call, wherein said data call includes a first data signal;
   generating at the central office a call-waiting data signal portion corresponding to information indicating that the third party seeks to communicate with the subscriber; and
   merging said call-waiting data signal portion with the first data signal occurring as a result of the data call without disrupting the data call.

2. A method as claimed in claim 1, wherein said information indicating that the third party seeks to communicate with the subscriber includes information identifying the third party.

3. A method as claimed in claim 1, further comprising the step of:
   detecting the presence of said call-waiting data signal portion merged with the data signal, occurring as a result of the data call the subscriber is engaged in, while the subscriber is engaged in the data call.

4. The method as claimed in claim 3, wherein:
   the subscriber is engaged in the data call using a computer;
   said computer is used to detect the presence of said call-waiting data signal portion merged with the data signal.

5. A method as claimed in claim 3, further comprising the step of:
   notifying the subscriber of the presence of said call-waiting data signal portion, while the subscriber is engaged in the data call.

6. The method as claimed in claim 5, wherein:
   the subscriber is engaged in the data call using a computer and an output device;
   said step of notifying includes at least one of the following actions using said output device:
      displaying a message;
      displaying an icon;
      producing an audible message, or
      producing an audible tone.

7. A method as claimed in claim 5, further comprising the step of:
   receiving the third party communication.

8. A method as claimed in claim 5, further comprising the step of:
   redirecting the third party communication to at least one of the following:
      a voice messaging service;
      another telephone line; or
      a cellular telephone.

9. A method as claimed in claim 4, further comprising the step of:
   holding the subscriber's data call when the subscriber receives the third party communication.

10. A method as claimed in claim 4, further comprising the step of:
    maintaining the subscriber's data call when the subscriber received the third party communication.

11. A method as claimed in claim 10, further comprising the step of:
    storing the subscriber's data call while the subscriber receives the third party communication.

12. A method as claimed in claim 10, further comprising the step of:
    resynchronizing the subscriber's data call after the subscriber receives the third party communication.

13. A method as claimed in claim 3, further comprising the step of:
    interpreting the information corresponding to said call-waiting data signal portion.

14. A method as claimed in claim 13, further comprising the step of:
    notifying the subscriber of the interpreted information corresponding to said call-waiting data signal portion.

15. A method as claimed in claim 14, wherein:
    the subscriber is engaged in the data call via a computer and output device;
    said step of notifying includes using said out put device to communicate the interpreted information corresponding to said call-waiting data portion to the subscriber, while the subscriber is engaged in the data call.

16. In a telephone system, a method for providing call-waiting notification to remotely located subscribers from a central office, said method comprising the steps of:
    providing a plurality of telephone lines which allow the subscribers to engage in either a voice call or a data call, but not both simultaneously;
    automatically determining when a third party seeks to communicate with one of the subscribers via an engaged telephone line;
    polling the engaged telephone line and detecting whether the engaged telephone line is carrying a data call; and
    providing notification of the third party to the subscriber which the third party is attempting to communicate with, without disrupting the data call.

* * * * *